US011388858B2

(12) United States Patent
Barther et al.

(10) Patent No.: US 11,388,858 B2
(45) Date of Patent: Jul. 19, 2022

(54) AGRICULTURAL WORK MACHINE

(71) Applicant: CLAAS Selbstfahrende Erntemaschinen GmbH, Harsewinkel (DE)

(72) Inventors: Marvin Barther, Hoevelhof (DE); Dennis Neitemeier, Lippetal (DE); Frédéric Fischer, Arnsberg (DE); Boris Kettelhoit, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 545 days.

(21) Appl. No.: 16/440,036

(22) Filed: Jun. 13, 2019

(65) Prior Publication Data

US 2020/0015416 A1 Jan. 16, 2020

(30) Foreign Application Priority Data

Jul. 13, 2018 (DE) .......................... 102018116990.6

(51) Int. Cl.
*A01D 41/127* (2006.01)
*G06T 7/00* (2017.01)
(Continued)

(52) U.S. Cl.
CPC ....... *A01D 41/127* (2013.01); *A01D 41/1271* (2013.01); *B60R 1/00* (2013.01);
(Continued)

(58) Field of Classification Search
CPC .... A01D 41/127; A01D 41/1271; G06T 7/97; G06T 7/70; G06T 7/20; G06T 11/20;
(Continued)

(56) References Cited

U.S. PATENT DOCUMENTS 6,185,990 B1 * 2/2001 Missotten ............ A01B 79/005
56/10.2 A
9,928,606 B2 3/2018 Roth et al.
(Continued)

FOREIGN PATENT DOCUMENTS

EP 2143316 A1 1/2010
EP 3150047 A1 * 4/2017 ......... A01D 41/1271
(Continued)

OTHER PUBLICATIONS

European Search Report dated Nov. 22, 2019 in European Application No. 19 17 2879 with English translation of the relevant parts.

*Primary Examiner* — Terrell M Robinson
(74) *Attorney, Agent, or Firm* — Collard & Roe, P.C.

(57) ABSTRACT

An agricultural work machine has a crop collection arrangement for separating and collecting crops from field vegetation, which crop collection arrangement has at least one crop cutting device, a crop conveying device arranged downstream thereof and a crop intake device arranged downstream thereof, and having a control device which has at least one sensor unit for optically detecting a crop flow, an image processing unit for processing images which are generated by the sensor unit based on the optically detected crop flow, and a data output unit for displaying the images processed by the image processing unit. The image processing unit generates a velocity characteristic map and a directional change characteristic map based on the images generated by the sensor unit. The two characteristic maps are utilized jointly or each individually by the control device to control processes in the agricultural work machine and/or in the crop collection arrangement.

19 Claims, 4 Drawing Sheets

(51) Int. Cl.
*G06T 7/70* (2017.01)
*B60R 1/00* (2022.01)
*G06T 7/20* (2017.01)
*G06T 11/20* (2006.01)
*G06T 11/40* (2006.01)
*H04N 7/18* (2006.01)

(52) U.S. Cl.
CPC .................. *G06T 7/20* (2013.01); *G06T 7/70* (2017.01); *G06T 7/97* (2017.01); *G06T 11/20* (2013.01); *G06T 11/40* (2013.01); *H04N 7/183* (2013.01); *B60R 2300/20* (2013.01); *B60R 2300/30* (2013.01); *G06T 2207/10016* (2013.01); *G06T 2207/30188* (2013.01)

(58) Field of Classification Search
CPC ........... G06T 11/40; G06T 2207/10016; G06T 2207/30188; B60R 1/00; B60R 2300/20; B60R 2300/30
See application file for complete search history.

(56) References Cited

U.S. PATENT DOCUMENTS

| | | | |
|---|---|---|---|
| 2002/0193928 A1* | 12/2002 | Beck | A01B 79/005 |
| | | | 701/50 |
| 2016/0270286 A1* | 9/2016 | Boydens | A01D 41/1278 |
| 2018/0084719 A1 | 3/2018 | Neitemeier et al. | |
| 2018/0267553 A1* | 9/2018 | Ebertseder | A01B 69/004 |
| 2019/0223375 A1* | 7/2019 | Missotten | B60K 35/00 |

FOREIGN PATENT DOCUMENTS

| | | | |
|---|---|---|---|
| EP | 3150047 A1 | 4/2017 | |
| EP | 3300019 A1 | 3/2018 | |

* cited by examiner

AGRICULTURAL WORK MACHINE

CROSS-REFERENCE TO RELATED APPLICATIONS

This application claims priority under 35 USC 119 of German Application No. 10 2018 116990.6, filed on Jul. 13, 2018, the disclosure of which is herein incorporated by reference.

BACKGROUND OF THE INVENTION

The invention is directed to an agricultural work machine, in particular a harvester. Agricultural work machines which include, in particular, self-propelled harvesters such as combine harvesters and forage harvesters generally having a crop collection arrangement by which crops in field vegetation can be separated and collected for further processing. A crop collection arrangement in itself generally has a plurality of individual components which can be operated with different parameters. Examples of such components in a combine harvester are a crop pickup device in the form of a reel, a crop cutting device in the form of a cutting unit table with a knife bar, a crop conveying device in the form of an auger, in particular a cross auger, and a crop intake device in the form of a feed rake. In a combine harvester, for example, the placement (cut height, position) and rate of rotation of the reel and the speed of the cross auger and feed rake can be adjusted. In this way, the crop flow inside the crop collection arrangement can be influenced. The driving speed of the harvester further influences the crop flow inside of the crop collection arrangement because the collected crop quantity which is processed by the crop collection arrangement is influenced in this way.

Despite a number of automatic adjustments of the crop collection arrangement, the driver of the agricultural work machine must constantly visually monitor the crop flow inside the crop collection arrangement. For example, the driver must ensure that the crop flow velocity inside the crop collection arrangement is as uniform as possible because when the crop flow is irregular, the speed of the vehicle and therefore, collection of crops may have to be reduced in order to avoid a crop jam. If a crop jam occurs, i.e., a reduction in the crop flow velocity to the point of stoppage, the harvesting process must be interrupted and a time-consuming clearing of the crop jam must be performed. The time required for this significantly compromises the efficiency of the harvesting operation.

Detecting a crop jam at the earliest possible moment can be challenging. By the time a crop jam has become clearly visible, it is often already too late to correct the operation of the crop collection arrangement. For this reason, it is known from EP 3 300 019 A1 to provide a control device with a sensor unit and an image processing unit via which the crop flow is monitored using the method of optical flow. For example, the sensor device has two cameras which are directed from the driver's cab onto the crop collection arrangement and which detect individual portions of the components and the crop flow. The sensor device generates an image sequence, i.e., a plurality of consecutive images. According to the prior art, every two consecutive images are grouped to form an image pair, and positional shifts of intensity patterns (pixels or groups of pixels) between the images of the respective image pair are determined. The intensity patterns are not necessarily formed by objects or particular crop features but generally by pixels or groups of pixels in the image whose position changes from one image to the next image. When the time interval between the images of the image pair is known, the velocity at which the intensity patterns travel can be deduced from these positional shifts of the intensity patterns. The velocities of a plurality of intensity patterns can be combined for each image pair and each image sequence comprising a plurality of image pairs to form velocity characteristic maps which can also be displayed visually. A velocity characteristic map of this kind is also referred to as optical flow. With regard to the method of optical flow and its application for monitoring the crop flow inside of a crop collection arrangement, reference is made to EP 3 300 019 A1 which originated with the Applicant and the disclosure of which is herein incorporated by reference.

In the above-cited prior art which makes use of the optical flow method, i.e., velocity characteristic maps, to monitor the crop collection arrangement and to prevent crop jams, it is important that the image processing is as precise as possible so that the course of the intensity patterns can be determined as accurately as possible and an incipient crop jam can be addressed in a suitably timely manner.

SUMMARY OF THE INVENTION

It is therefore an object of the invention to configure and further develop an agricultural work machine in such a way that the monitoring of a crop collection arrangement is further improved with respect to accuracy, reliability and timeliness.

The above-mentioned problem is solved in an agricultural work machine having a crop collection arrangement for separating and collecting crops from field vegetation, which crop collection arrangement has as components at least one crop cutting device, a crop conveying device arranged downstream thereof and a crop intake device arranged downstream thereof, and having a control device which has at least one sensor unit for optically detecting a crop flow, an image processing unit for processing images which are generated by the sensor unit based on the optically detected crop flow, and a data output unit for displaying the images processed by the image processing unit. The image processing unit generates a velocity characteristic map based on the images generated by the sensor unit. The image processing unit is configured to produce, in addition to the velocity characteristic map, a directional change characteristic map based on the images generated by the sensor unit, and in that the two characteristic maps are utilized jointly or each individually by the control device to control processes in the agricultural work machine and/or in the crop collection arrangement.

The key fundamental consideration is to supplement the information provided by a velocity characteristic map by further information which can be obtained via the optical flow method. Accordingly, the above-mentioned evaluation of image pairs of an image sequence generated by the sensor unit not only supplies information on velocities of intensity patterns, i.e., of pixels and/or groups of pixels, within the images but also information about the movement direction of the intensity patterns. Accordingly, a movement direction of the respective intensity pattern can be determined, based on pixels, from an image pair. Correspondingly, directional changes can be determined from a plurality of image pairs which show the same image section and, therefore, the same intensity patterns and which, in particular, directly follow one another. The directional changes of the individual intensity patterns, like the velocities of the latter, can be combined in a characteristic map, also referred to as a directional change characteristic map. The directional change characteristic map shows the directional changes of the intensity patterns from one image pair to the next image pair, in particular for the entire image sequence.

The information from the respective directional change characteristic map can then be utilized to check the plausibility of the information from the associated, i.e., temporally corresponding, velocity characteristic map. Accordingly, at low crop flow velocities which indicate a crop jam or at least an incipient crop jam, relatively large directional changes come about locally because the crop particles and, therefore, also the intensity patterns move increasingly transverse to the main flow direction. These transverse movements are detected as deviations from the main flow direction of the crop, and the degree of these deviations increases with decreasing velocity in the main flow direction. This may also be referred to as a dispersion of the angles which define the directional changes. Accordingly, points in the velocity characteristic map which indicate low velocities can be checked once again based on the associated directional change characteristic map. Errors in the determination of the actual crop flow movements can be minimized in this way.

It is now proposed to provide that the image processing unit is configured to produce, in addition to the velocity characteristic map, a directional change characteristic map based on the images generated by the sensor unit and that the two characteristic maps be utilized jointly or each individually by the control device to control processes in the agricultural work machine and/or in the crop collection arrangement. The accuracy and therefore also the reliability and timeliness of the monitoring of the crop flow in the crop collection arrangement can be improved in that a directional change characteristic map is also taken into account in addition to the velocity characteristic map.

In one configuration, the velocity characteristic map can have crop flow velocities and/or velocities of surface portions of machine parts. The machine parts are those of the components of the crop collection arrangement. Since these components also move and can be optically detected by the sensor unit, pixel-based positional shifts can also be detected for this purpose and corresponding velocities can be derived therefrom. Additionally or alternatively, the directional change characteristic map can have directional changes in the crop flow and/or of the surface portions of the machine parts. This results in a special advantage. Since machine parts are detected in some cases as areas with low velocity, it can be determined by consulting the directional change characteristic map whether the respective detected location with low velocity is a location through which crops flow, which would indicate a jam, or whether the location is free from crops and the low velocity is traced in this case merely to the low velocity of the respective surface portion of the machine part. Misinterpretations in which locations of low velocity are mistakenly interpreted as crop jams where there is actually no crop jam and, in particular, no crops are present at all, can be prevented in this way.

There are several possibilities for producing the two characteristic maps, i.e., the velocity characteristic map and the directional change characteristic map. In this regard, the velocities determined in each instance by the image processing unit and the directional changes or angles determined in each instance by the image processing unit can also be graphically displayed via the data output unit. Different velocities and/or different directional changes are particularly preferably displayed with different colors.

According to a preferred configuration, the graphical display of velocities and/or directional changes can also be carried out in a display device of the data output unit so that it is visually discernable to the driver. Preferred configurations of the control device can compare the calculated velocities or directional changes with predetermined limiting values. In particular, an upper limiting value and a lower limiting value can be determined, and all velocities or directional changes above the upper limiting value define an optimal crop flow, and/or velocities or directional changes between the two limiting values are interpreted as crop flow in which a crop jam is imminent, and/or velocities or directional changes below the lower limiting value are interpreted as a crop jam. With a classification of this kind, particularly when using a range above an upper limiting value, a further range between the upper limiting value and a lower limiting value, and a range below the lower limiting value, changes in the crop flow can be responded to particularly promptly. In particular, prognostic information which brings about control measures that can prevent the initiation of a crop jam, not to mention an actual crop jam, already prior to an incipient crop jam can also be generated.

Preferred areas which can be detected by the sensor unit are can include both the (unharvested) field vegetation in front of the crop collection arrangement and the (harvested) field vegetation behind the crop collection arrangement. Components of the crop collection arrangement such as a crop pickup device, a crop cutting device, a crop conveying device and a crop intake device can also be detected. Further, the crop flow can be detected at different locations, for example, inside of the crop pickup device and/or above the crop cutting device.

In one configuration, the image processing unit is adapted to determine, in the images, image areas which particularly correspond to the above-mentioned areas. The image areas can then be individually analyzed and also graphically displayed. This allows the velocities and/or directional changes to be calculated for the respective image area and the characteristic map for the respective image area to be produced.

According to a particularly preferred configuration, the image area with the crop flow inside of the crop pickup device and/or the image area with the crop flow vertically above the crop cutting device is divided transverse to driving direction into sub-areas, and mean values can be specified for the crop flow velocities for each sub-area. These mean values are preferably absolute values or ratios with respect to a reference value. In this way, the homogeneity of the crop flow can be determined particularly as percentage values. These values can preferably also be graphically displayed. In this case, also, different colors or the like can be used for different values or value ranges. In principle, however, these values can also be displayed as numeral values.

Different control measures can be carried out by using characteristic maps. These control measures can be carried out ahead of time, that is, prior to an incipient crop jam.

The crop pickup device can be a reel, the crop cutting device can be a cutting unit table with a knife bar, the crop conveying device can be an auger, and/or the crop intake device can be a feed rake.

A method for the operation of an agricultural work machine, in particular an agricultural work machine as proposed above, includes producing a directional change characteristic map in addition to a velocity characteristic map and the directional change characteristic map is utilized by the control device for controlling processes in the agricultural work machine and/or in the crop collection arrangement. With regard to the method, reference is made to the description of the proposed agricultural work machine.

BRIEF DESCRIPTION OF THE DRAWINGS

The invention will be described in more detail in the following referring to drawings in which only one embodiment example is depicted. In the drawings.

DETAILED DESCRIPTION OF THE EMBODIMENTS

Figure 1:
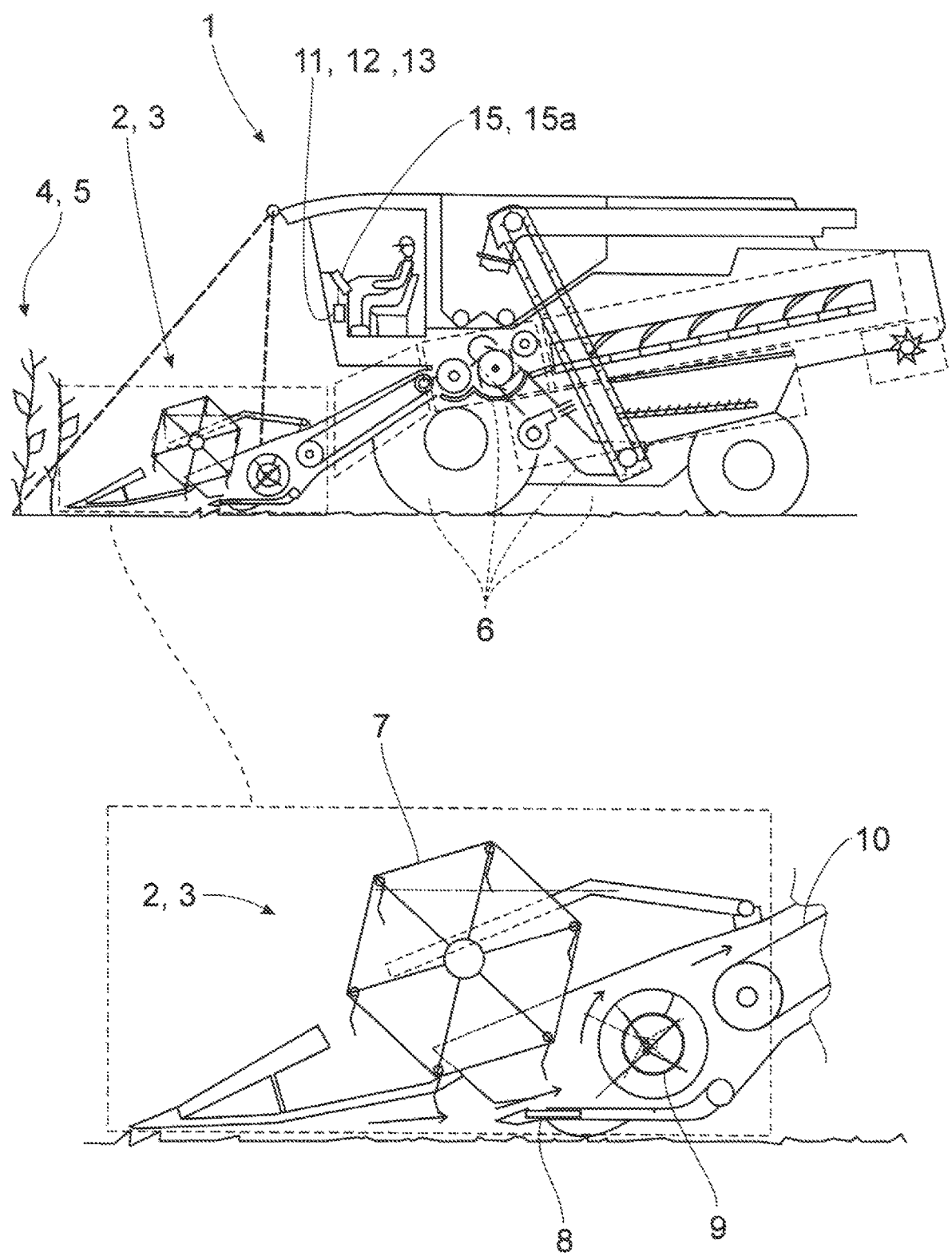
FIG. 1 is a schematic side view of a proposed agricultural work machine and a detailed view of the crop collection arrangement of the agricultural work machine.

The proposed agricultural work machine 1 which, in this case, is a combine harvester, for example, has a crop collection arrangement 2 which is formed in this case by a cutting unit 3 and is arranged in front of the agricultural work machine 1 with reference to driving direction. The crop collection arrangement 2 or cutting unit 3 serves to separate and collect crops 4 from field vegetation 5, and the crops 4 are supplied for further processing by a plurality of further work elements 6 of the agricultural work machine 1.

In this instance and preferably, the crop collection arrangement 2 has, as components, a crop pickup device 7 in the form of a reel, a crop cutting device 8 in the form of a cutting unit table with a knife bar, a crop conveying device 9 in the form of an auger, in particular a cross auger, arranged downstream thereof with respect to the process and a crop intake device 10 in the form of a feed rake which is again arranged downstream thereof with respect to the process.

In the proposed agricultural work machine 1, the crop 4 is guided as crop flow (indicated by arrows in FIGS. 1 and 3a) through the crop collection arrangement 2. In this instance and preferably, the crop 4 is collected and held via the crop pickup device 7 or reel while it is being separated by the crop cutting device 8. The separated crop 4 is then moved toward the crop conveying device 9 which, in this instance and preferably, extends transversely and is conveyed from the latter in transverse direction, i.e., transverse to driving direction, toward the center of the vehicle where it is then taken in by the crop intake device 10 and conveyed further into the interior of the agricultural work machine 1.

Figure 2:
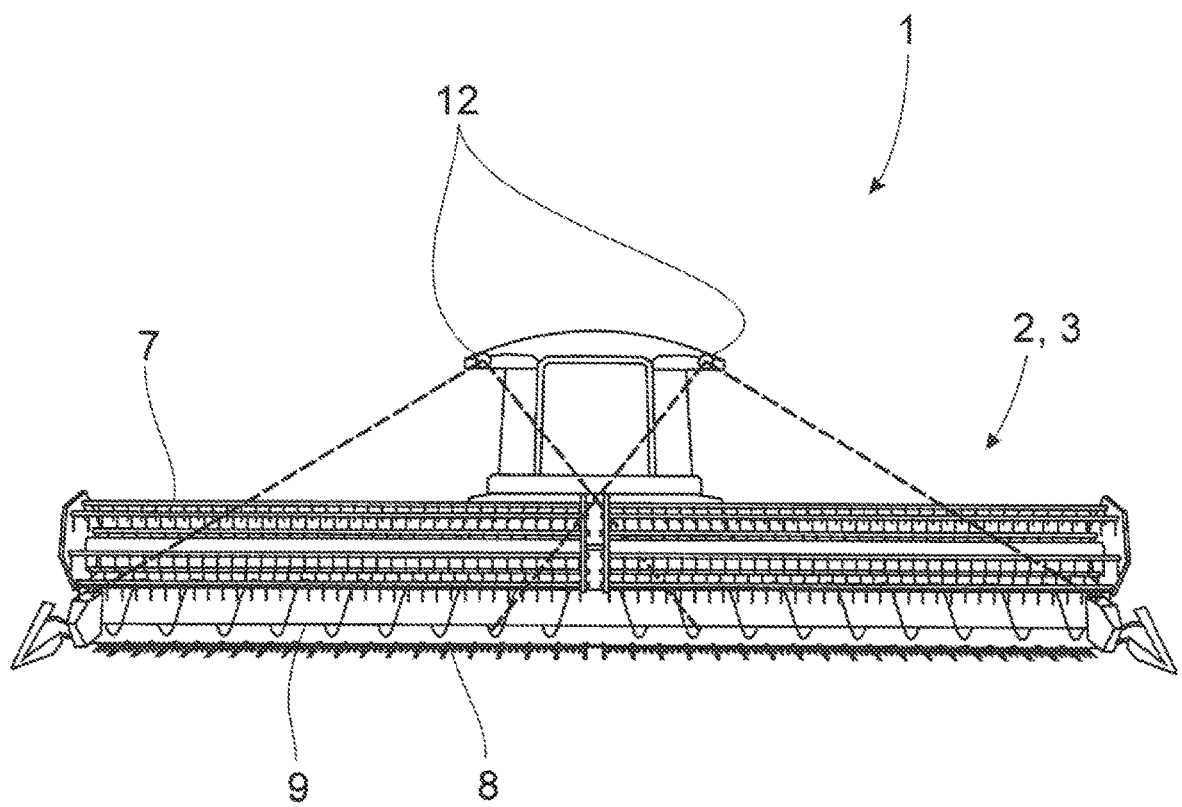
FIG. 2 is a schematic front view of the proposed agricultural work machine with the crop collection arrangement.

The agricultural work machine 1 further has a control device 11 which, in this instance and preferably, serves also to control the further work elements 6 of the agricultural work machine 1 in addition to the above-mentioned components 7-10 of the crop collection arrangement 2. The control can include a velocity control or rotating speed control and/or height adjustments and/or position adjustments. Also in this instance and preferably, the driving speed of the agricultural work machine 1 is controlled via the control device 11. In this instance and preferably, control device 11 has a sensor unit 12 in the form of two cameras. Sensor unit 12 is arranged in the front area of the agricultural work machine 1 and serves for optical detection of the crop flow. The range of optical detection is depicted symbolically in dashed lines in FIGS. 1 and 2.

Figure 3:
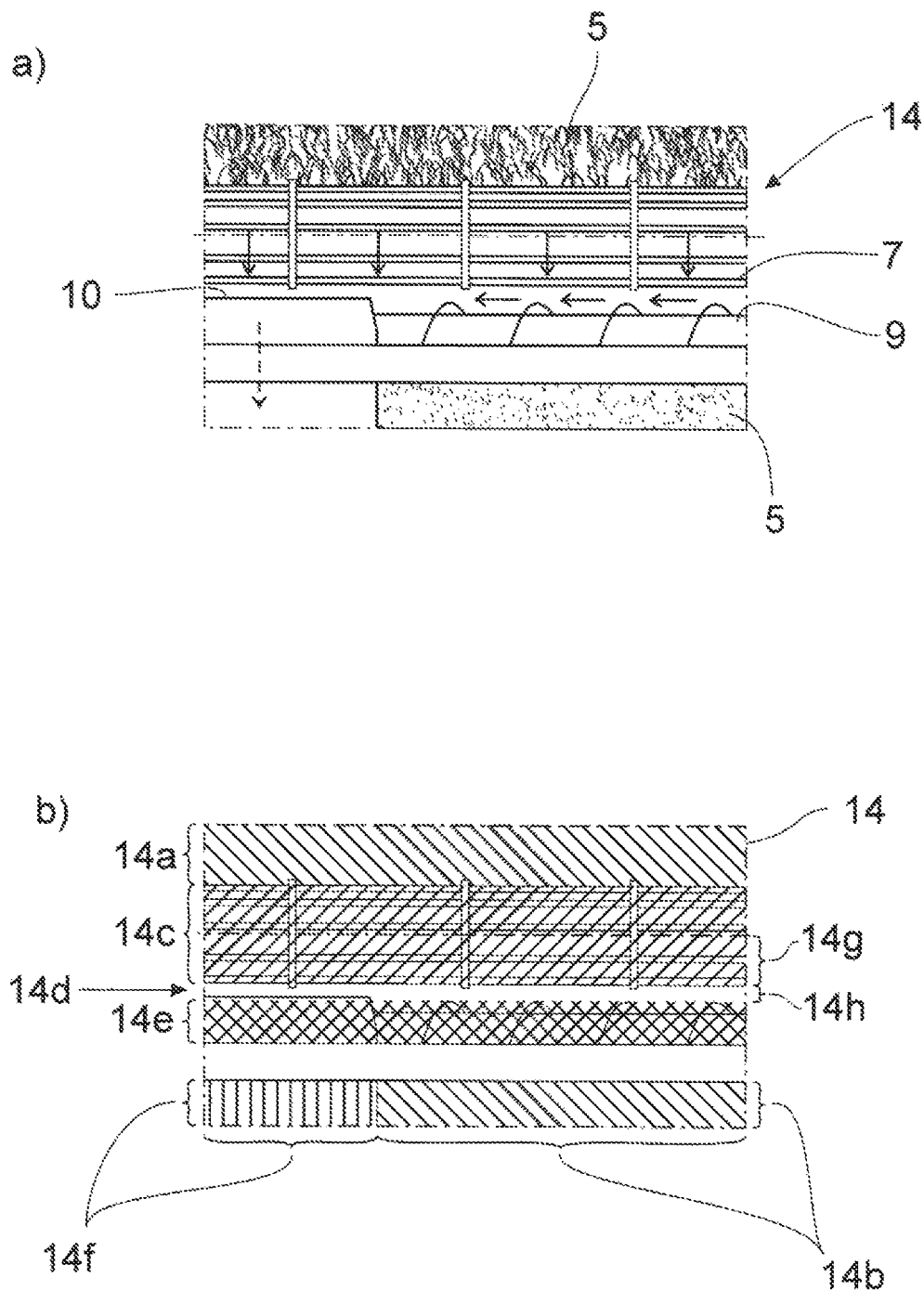
FIG. 3 is a schematic view a) of an image with the crop collection arrangement that is generated by the sensor unit of the proposed agricultural work machine, and b) of the image after processing by the image processing unit of the proposed agricultural work machine.

Further, the control device 11 has an image processing unit 13 for processing images 14, one of which is shown by way of example in FIG. 3a). Images 14 are generated by the sensor unit 12 based on the optically detected crop flow.

Further, the control device 11 has a data output unit 15 which, in this instance and preferably, comprises a display device 15a) and serves to display the images 14 processed by the image processing unit 13.

The image processing unit 13 in the proposed agricultural work machine 1 produces a velocity characteristic map 16, also known as optical flow, based on the images 14 generated by the sensor unit 12. The optical flow is the pixel movement in the image area, also known as the flow field, determined by an image frequency. The image frequency is in turn defined by the pixel position and the time. The movement is a vector field in an image 14 that is generated by superimposing two images 14 of an image pair and describes the time-dependent displacement of a pixel or of a group of pixels, also referred to hereinafter as intensity pattern, from one image to the next image of the image pair. The image which is composed of the two individual images 14 can be reworked beforehand through the image processing unit 13 as is described in detail, for example, in EP 3 300 019 A1. The Lucas-Kanade method, in which the image resolution of the images is reduced, is mentioned here merely by way of example. Further, noise suppression, change in contrast, change in brightness or the like can be carried out. The resulting image is then used to produce the velocity characteristic map 16.

It is key in the suggested agricultural work machine 1 that the image processing unit 13 is configured to generate a directional change characteristic map 17 in addition to the velocity characteristic map 17 based on the images 14 generated by the sensor unit 12. According to the suggestion, both characteristic maps 16, 17 are utilized jointly or each by itself by the control device 11 to control processes in the agricultural work machine 1, for example, to control the work elements 6 and/or processes in the crop collection arrangement, for example, the above-mentioned components 7-10. The image processing unit 13 generates the characteristic maps 16, 17 which are in turn utilized by the control device 11, in particular a computer unit (not shown) of the control device 11, for the control measures mentioned above.

In this instance, the velocity characteristic map 16 has, for one, the crop flow velocities, particularly of crop particles, and velocities of surface portions of machine parts of the components of the crop collection arrangement 2, in this case specifically in the form of velocity ranges $v_1$-$v_4$ in which a plurality of velocities are combined to form a range. The directional change characteristic map 17 has directional changes, particularly of crop particles, in the crop flow and/or directional changes of surface portions of machine parts of components 7-10 of the crop collection arrangement 2, in this case in the form of directional change ranges $\Delta_1$-$\Delta_5$ in which a plurality of directional changes are combined to form a range.

In order to generate characteristic maps 16, 17, the image processing unit 13 groups two images 14 in each instance, in particular two directly consecutive images 14, of an image sequence generated by the sensor unit 12 to form an image pair. A time interval between the images 14 of the respective image pair is detected by the image processing unit 13. Additionally or alternatively, a time interval may be predetermined by the image processing unit 13. Each image 14 of the respective image pair has an intensity pattern, i.e., a pixel or a group of pixels. The image processing unit 13 determines positional shifts of the intensity patterns between the images 14 of the respective image pair which include shift amounts and shift directions. In this instance and preferably, the shift amounts and shift directions for each image pair are combined as vectors of a vector field of the respective image pair.

Velocities are then calculated by the image processing unit 13 from the shift amounts of the intensity patterns between the images 14 of the respective image pair and the time interval between the images 14 of the respective image pair. As has already been indicated, the velocities are crop flow velocities and/or velocities of surface portions of components 7-10 of the crop collection arrangement 2. In this instance and preferably, the respective velocities, in this case in the form of velocity ranges $v_1$-$v_4$ in which a plurality of velocities are combined to form a range, are then graphically displayed by the data output unit 15, particularly by the display device 15a. In this instance and preferably, different velocities or velocity ranges $v_1$-$v_4$ are displayed in different colors. Instead of different colors, different grayscales and/or textures can also be used.

In this instance and preferably, the image processing unit 13 compares shift directions of intensity patterns of a first image pair with shift directions of associated intensity patterns of a second image pair of the same image sequence, in particular of an immediately succeeding image pair. By "associated intensity patterns" is meant that the same pixel or the same group of pixels used in the first image pair is used in the second image pair. The directional changes are calculated from the comparison of the shift directions between the two image pairs. In this instance and preferably, these directional changes are directional changes in the crop flow and/or of the surface portions of the machine parts. These directional changes are also graphically displayed by the data output unit 15 or display device 15a, in the present case in the form of directional change ranges $\Delta_1$-$\Delta_5$ in which a plurality of the directional changes are combined to form a range. Here also, different directional changes or directional change ranges $\Delta_1$-$\Delta_5$ are displayed by different colors or, alternatively, grayscales and/or textures can also be used.

Figure 4:
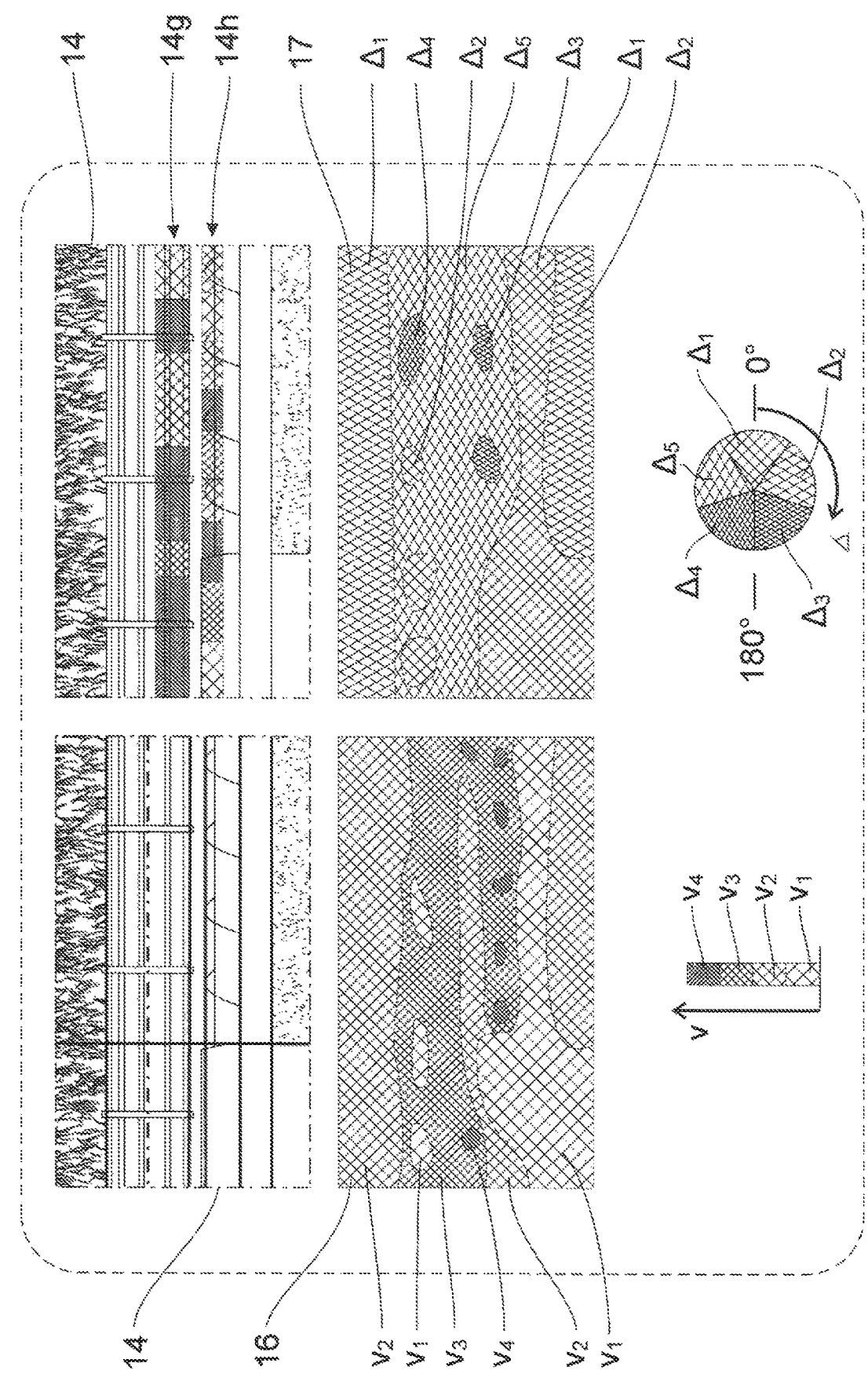
FIG. 4 is a schematic view of a display device of the data output unit of the proposed agricultural work machine.

An example for the display of different velocities or velocity ranges $v_1$-$v_4$ by different colors, grayscales and/or textures is shown at center left in FIG. 4. A corresponding depiction of different directional changes or directional change ranges $\Delta_1$-$\Delta_5$ is found at center right.

FIG. 4 schematically shows a view of the display device 15a, wherein an image 14 of an image sequence which is generated by the sensor unit 12 is shown at top left. The image 14 corresponds to the image in FIG. 3a).

As was mentioned, the velocity characteristic map 16 is shown in the display device 15a at center left and the directional change characteristic map 17 is shown at center right. A definition of the colors, grayscales and/or textures for velocities or velocity ranges $v_1$-$v_4$ is shown at bottom left and that for directional changes or directional change ranges $\Delta_1$-$\Delta_5$ is shown at bottom right.

FIG. 4 shows the view of the display device 15a at a determined time. The entire image sequence is displayed over the time, wherein the velocity characteristic map 16 and the directional change characteristic map 17 are always immediately adapted to the successive images of the image sequence.

The control device 11 is configured, in this instance and preferably, to compare velocities and directional changes calculated by the image processing unit 13 with, in each instance, at least one predetermined limiting value, in this case an upper limiting value and a lower limiting value. As has already been described, when the value falls below the respective limiting value, corresponding control measures of the agricultural work machine 1 and/or of the crop collection arrangement 2 are carried out.

As is shown in FIG. 3b), the images 14 are divided into different image areas by the image processing unit 13. As can be seen from FIGS. 3a) and 3b), the sensor unit 12 detects the field vegetation 5 in front of and behind the crop collection arrangement 2. In addition, in the present instance and preferably, the crop pickup device 7, the crop cutting device 8, the crop conveying device 9 and the crop intake device 10 can be detected by the sensor unit 12. The crop flow inside of the crop pickup device 7 and the crop flow vertically above the crop cutting device 8 is also detected, in this case between the crop pickup device 7 and the crop conveying device 9. In order to isolate the relevant areas with crop flow, image areas are determined in the images 14, in the present instance and preferably an image area 14a with the field vegetation 5 in front of the crop collection arrangement 2, an image area 14b with the field vegetation 5 behind the crop collection arrangement 2, an image area 14c with the crop pickup device 7, an image area 14d with the crop cutting device 8, an image area 14e with the crop conveying device 9, an image area 14f with the crop intake device 10, an image area 14g with the crop flow inside of the crop pickup device 7 and/or an image area 14h with the crop flow vertically above the crop cutting device 8, in particular in the area between the crop pickup device 7 and the crop conveying device 9.

Preferably for all of these image areas 14a to 14h, the image processing unit 13 calculates the velocities and/or the directional changes which are combined to form the velocity characteristic map 16 and the directional change characteristic map 17.

In the present instance and preferably, the two image areas 14g and 14h with the respective crop flow are divided into sub-areas by the image processing unit 13 transverse to the driving direction, which is depicted symbolically at top right in FIG. 4 by different textures in the image areas 14g and 14h. For each sub-area, the image processing unit 13 determines a mean value for the crop flow velocities, which may be an absolute value or the ratio with respect to a reference value, in particular with respect to the upper limiting value. For visualization, the mean values can also be displayed by different colors, grayscales and/or textures. Additionally or alternatively, corresponding numerical values, particularly percentage values, can also be displayed (not shown).

REFERENCE CHARACTERS 1 agricultural work machine
2 crop collection arrangement
3 cutting unit
4 crop
5 field vegetation
6 further work elements
7 crop pickup device
8 crop cutting device
9 crop conveying device
10 crop intake device
11 control device
12 sensor unit
13 image processing unit
14 image
14a-h image areas
15 data output unit
15a display device 16 velocity characteristic map
17 directional change characteristic map
$v_1$-$v_4$ velocity ranges
$\Delta_1$-$\Delta_5$ directional change ranges

What is claimed is:

1. An agricultural work machine, comprising:
a crop collection arrangement for separating and collecting crops from field vegetation, the crop collection arrangement comprising at least one crop cutting device, a crop conveying device arranged downstream of the crop cutting device, and a crop intake device arranged downstream of the crop conveying device, and
a closed-loop control device comprising at least one sensor unit for optically detecting a crop flow, an image processing unit for processing images generated by the sensor unit based on the optically detected crop flow, and a data output unit for displaying the images processed by the image processing unit,
wherein the image processing unit is configured to generate a velocity characteristic map and a directional change characteristic map based on the images generated by the sensor unit,
wherein the control device is configured to check plausibility of information from the velocity characteristic map using information from the directional change characteristic map temporally corresponding to the velocity characteristic map to detect errors in determination of actual crop flow movements, and
wherein the control device is configured to utilize the two characteristic maps jointly or each individually to control processes in the agricultural work machine and/or in the crop collection arrangement.

2. The agricultural work machine according to claim 1, wherein the velocity characteristic map includes crop flow velocities and/or velocities of surface portions of machine parts of components of the crop collection arrangement, and/or the directional change characteristic map includes directional changes in the crop flow and/or directional changes of surface portions of machine parts of components of the crop collection arrangement.

3. The agricultural work machine according to claim 1, wherein in order to generate the two characteristic maps, the image processing unit is configured such that the image processing unit groups two directly consecutive images of an image sequence generated by the sensor unit to form an image pair, wherein the image processing unit is configured to detect or predetermine a time interval between the images of the respective image pair, and wherein each image of the respective image pair has an intensity pattern.

4. The agricultural work machine according to claim 3, wherein in order to generate the two characteristic maps, the image processing unit is configured to determine positional shifts of the intensity patterns between the images of the respective image pair, wherein the positional shifts include shift amounts and shift directions of the intensity patterns, and wherein the shift amounts and shift directions for each image pair are combined as vectors of a vector field of the respective image pair.

5. The agricultural work machine according to claim 4, wherein the image processing unit is configured to calculate velocities from the shift amounts of the intensity patterns between the images of the respective image pair and the time interval between the images of the respective image pair, wherein the velocities are crop flow velocities of the crop flow and/or the velocities of the surface portions of the machine parts of the components of the crop collection arrangement.

6. The agricultural work machine according to claim 5, wherein the data output unit is configured to graphically display the respective velocities in the form of velocity ranges ($v_1$-$v_4$) which combine a plurality of velocities, wherein different velocities and/or velocity ranges ($v_1$-$v_4$) are displayed with different colors, grayscales and/or textures.

7. The agricultural work machine according to claim 6, wherein the graphical display of the velocities and/or the graphical display of the directional changes are displayed adjacent to one another in a display device of the data output unit, wherein the display device is also configured to display an image sequence.

8. The agricultural work machine according to claim 4, wherein the image processing unit is configured to compare shift directions of the intensity patterns of a first image pair with shift directions of associated intensity patterns of an immediately succeeding second image pair of the same image sequence, and to calculate therefrom directional changes in the crop flow and/or directional changes of surface portions of machine parts of the components of the crop collection arrangement.

9. The agricultural work machine according to claim 8, wherein the data output unit is configured to graphically display the respective directional changes in the form of directional change ranges ($\Delta_1$-$\Delta_5$) which combine a plurality of the directional changes, wherein different directional changes and/or directional change ranges ($\Delta_1$-$\Delta_5$) are displayed with different colors, grayscales and/or textures.

10. The agricultural work machine according to claim 1, wherein the control device is configured to compare velocities calculated by the image processing unit with at least one predetermined limiting value and to control the agricultural work machine or one or more components of the crop collection arrangement when the value of the calculated velocities falls below the predetermined limiting value.

11. The agricultural work machine according to claim 1, wherein the control device is configured to compare directional changes calculated by the image processing unit with at least one predetermined limiting value and to control the agricultural work machine or one or more components of the crop collection arrangement when value of the calculated directional changes falls below the predetermined limiting value.

12. The agricultural work machine according to claim 1, wherein the sensor unit is configured to detect field vegetation in front of the crop collection arrangement with reference to driving direction and/or field vegetation behind the crop collection arrangement with reference to driving direction and/or one or more of the components of the crop collection arrangement with reference to driving direction.

13. The agricultural work machine according to claim 1, wherein the image processing unit is configured to determine image areas in the images, wherein an image area includes images of at least portions of field vegetation in front of the crop collection arrangement with reference to driving direction, and/or an image area includes images of at least portions of field vegetation behind the crop collection arrangement with reference to driving direction, and/or an image area includes at least portions of a crop pickup device, and/or an image area includes images of at least portions of the crop cutting device, and/or an image area includes images of at least portions of the crop conveying device, and/or an image area includes images at least portions of the crop intake device, and/or an image area includes images of at least portions of the crop flow inside of the crop pickup device, and/or an image area includes images of at least portions of crop flow vertically above the crop cutting device.

14. The agricultural work machine according to claim 13, wherein the image processing unit is configured to calculate velocities and/or directional changes for one or more of the image areas and to generate the respective characteristic map.

15. The agricultural work machine according to claim 13, wherein the image processing unit is configured to divide the image area with the crop flow inside of the crop pickup device and/or the image area with the crop flow vertically above the crop cutting device with reference to driving direction, transverse to the driving direction into sub-areas and to determine for each sub-area a mean value for the crop flow velocities of the crop flow, wherein the mean value is an absolute value or the ratio with respect to a reference value.

16. The agricultural work machine according to claim 15, wherein the data output unit is configured to graphically display the mean value as a numerical value, and/or wherein different mean values are displayed with different colors, grayscales and/or textures.

17. The agricultural work machine according to claim 1, wherein the control of processes based on the velocity characteristic map and/or directional change characteristic map includes control of the driving speed of the agricultural work machine and/or the control of the velocity and/or position of one or more of the components of the crop collection arrangement and/or the control of the velocity and/or position of one or more further work elements of the agricultural work machine.

18. The agricultural work machine according to claim 1, wherein the crop collection arrangement includes a crop pickup device in the form of a reel, and/or wherein the crop cutting device is a cutting unit table with a knife bar, and/or the crop conveying device is an auger, and/or the crop intake device is a feed rake.

19. A method for the operation of an agricultural work machine having a crop collection arrangement for separating and collecting crops from field vegetation, which crop collection arrangement has as components at least one crop cutting device, a crop conveying device arranged downstream thereof and a crop intake device arranged downstream thereof, and having a control device which has at least one sensor unit for optically detecting a crop flow, an image processing unit for processing images which are generated by the sensor unit based on the optically detected crop flow, and a data output unit for displaying the images processed by the image processing unit, the method comprising the step of:

generating with the image processing unit a velocity characteristic map based on the images generated by the sensor unit and a directional change characteristic map based on the images generated by the sensor unit, checking with the control device plausibility of information from the velocity characteristic map using information from the directional change characteristic map temporally corresponding to the velocity characteristic map to detect errors in determination of actual crop flow movements, and controlling with the control device processes in the agricultural work machine and/or in the crop collection arrangement utilizing the two characteristic maps jointly or each individually.

* * * * *